May 9, 1950
R. L. PATTON
2,507,265
AUTOMOBILE TOW BAR
Filed Nov. 17, 1948
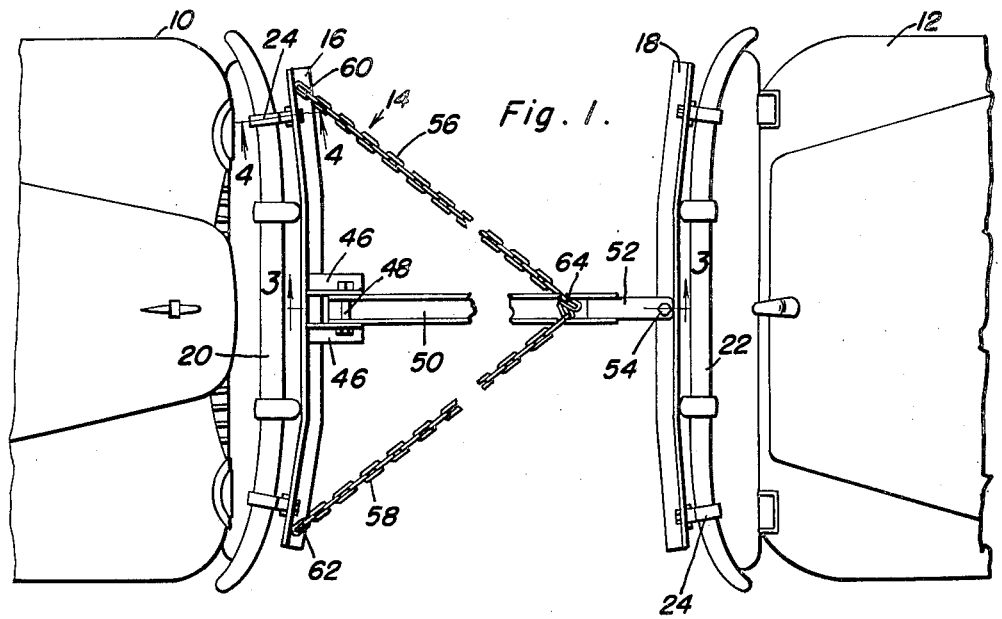
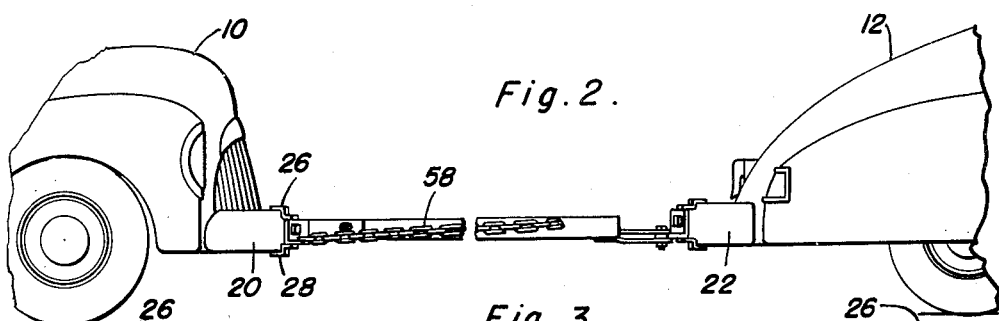
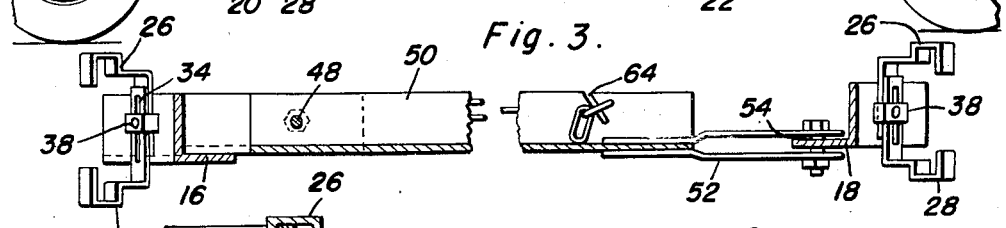
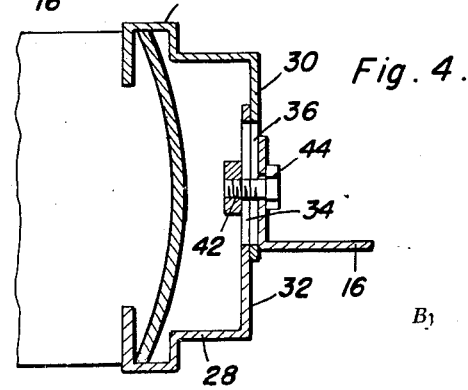
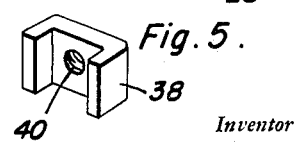
Inventor
Robert L. Patton
By Clarence A. O'Brien
and Harvey B. Jacobson
Attorneys Patented May 9, 1950

2,507,265

UNITED STATES PATENT OFFICE 2,507,265

AUTOMOBILE TOW BAR

Robert L. Patton, Glendale, Calif.

Application November 17, 1948, Serial No. 60,449

4 Claims. (Cl. 280—33.14)

This invention relates to a novel towbar for interconnecting a towing vehicle to a towed vehicle, the primary object of which is to permit the towing of a vehicle without the necessity of using a driver in the towed vehicle.

Another object of the invention is to provide a novel clamping means for adjustably securing the towbar to the bumpers of the vehicles.

Yet another object of the invention is to provide a towbar which is terminally pivoted, both horizontally and vertically, to the vehicles.

Yet another object of the invention is to provide in automotive vehicles; a towing means comprising a first and second bar, means for adjustably securing said bars to the bumpers of the vehicles, a towbar, means for vertically pivoting one end of said towbar on said first bar, means for horizontally pivoting the other end of said towbar to said second bar, and brace means interconnecting the ends of one of said bars with said towbar.

These, together with various ancillary objects and features of the invention which will later become apparent as the following description proceeds, are attained by the device, a preferred embodiment of which has been illustrated by way of example only in the accompanying drawings, wherein:

Figure 1 is a top plan view of the device;

Figure 2 is a side elevational view of the device;

Figure 3 is a longitudinal sectional view of the device taken on the line 3—3 of Figure 1;

Figure 4 is a sectional view taken on the line 4—4 of Figure 1; and

Figure 5 is a perspective view of a detail of construction.

Specific reference is now made to the drawings. In the several views in the accompanying drawings and in the following specification similar reference characters indicate corresponding elements throughout.

Indicated at 10 and 12 are the towed and towing vehicles respectively interconnected by the towbar 14 of the instant invention. The towbar includes a first angle bracket 16 and a second angle bracket 18 preferably contoured to conform to the shapes of the bumpers 20 and 22.

Each of the brackets 16 and 18 are adjustably secured to the bumpers by means of clamps 24 which as shown in Figure 4 consists of an upper clamping member 26 engageable over the bumpers and a lower clamping member 28 engageable under the bumper. The longer leg 30 of the upper member is slidable over the longer leg 32 of the lower member, the latter being provided with an elongated vertical slot 34 while the former is also provided with a slot 36. A U-shaped member 38 having a central threaded aperture 40 embraces the legs 30 and 32 and a screw 42 extends through the aperture 40, the slots 34 and 36 and an aperture in each of the brackets. A nut 44 engages the screw 42. Thus, it will be seen that the clamp is adjustable to the width of the bumpers.

Secured, as by welding, to the central portion of the bracket 16 is a pair of spaced angle irons 46 having aligned apertures in the vertical legs for receiving a pivot pin 48 which extends through aligned apertures in the legs of a U-shaped longitudinal bar 50. To the other end of the bar is secured a bifurcated member 52 through the furcations of which extends a vertical pivot pin 54 which also extends through an aperture in the bracket 18. Thus it will be seen that the towbar is horizontally pivoted at 48 and vertically pivoted at 54.

To brace the towbar and permit its use without a driver in the towed vehicle, chains 56 and 58 are provided which are terminally secured as at 60 and 62 to the ends of the bracket 16 and further terminally secured as at 64 to the bar 50.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having thus described the invention, what is claimed as new is:

1. In automotive vehicles; a towing means comprising a first and second bar, means for adjustably securing said bars to the bumpers of the vehicles, a towbar, means for vertically pivoting one end of said tow bar on said first bar, means for horizontally pivoting the other end of said towbar to said second bar, and brace means interconnecting the ends of one of said bars with said towbar.

2. The combination of claim 1 wherein said first-mentioned means includes clamps, each clamp having an upper member slidable over a lower member, an elongated slot in said lower member, and a locking pin extending through said slot, said upper member and one of said bars.

3. The combination of claim 1 wherein said vertical pivoting means includes a pair of spaced apertured longitudinal arms secured to said first bar and a pivot pin extending through said tow-bar and the apertures in said arms.

4. The combination of claim 1 wherein said brace means includes chains.

ROBERT L. PATTON.

REFERENCES CITED

The following references are of record in the file of this patent:

UNITED STATES PATENTS

| Number | Name | Date |
|---|---|---|
| 2,120,422 | Williams et al. | June 14, 1938 |
| 2,306,007 | Thorp | Dec. 22, 1942 |
| 2,439,518 | Kasboske | Apr. 13, 1948 |
| 2,447,250 | Holloway | Aug. 17, 1948 |
| 2,453,556 | Vars | Nov. 9, 1948 |